No. 691,546. Patented Jan. 21, 1902.
T. J. HUBBELL.
METHOD OF PROTECTING TREES.
(Application filed Apr. 8, 1901.)
(No Model.)
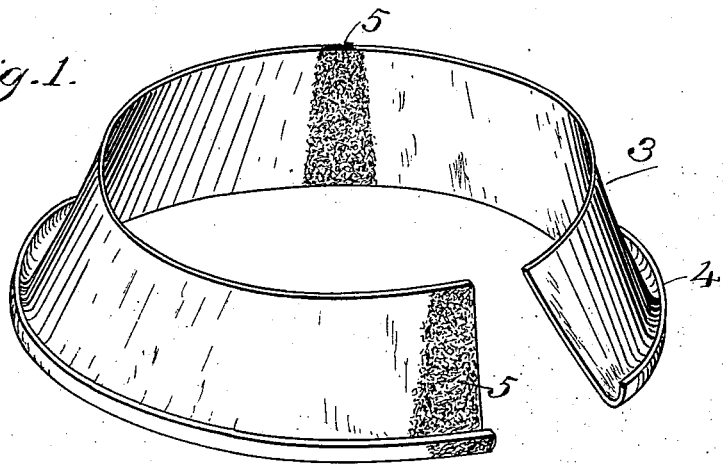
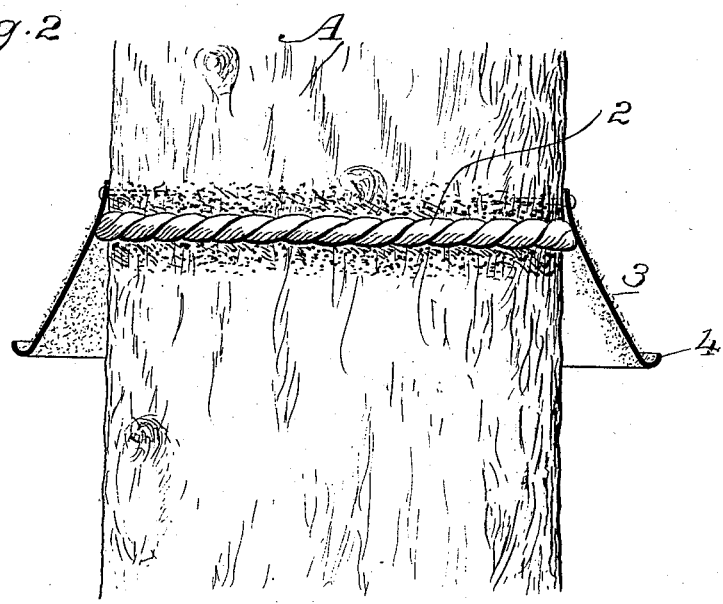

UNITED STATES PATENT OFFICE.

THOMAS J. HUBBELL, OF WATSONVILLE, CALIFORNIA, ASSIGNOR TO DRUSILLA HUBBELL AND WILLIAM H. AMES, OF WATSONVILLE, CALIFORNIA.

METHOD OF PROTECTING TREES.

SPECIFICATION forming part of Letters Patent No. 691,546, dated January 21, 1902.

Application filed April 8, 1901. Serial No. 54,855. (No specimens.)

*To all whom it may concern:*

Be it known that I, THOMAS J. HUBBELL, a citizen of the United States, residing at Watsonville, county of Santa Cruz, State of California, have invented an Improvement in Methods of Protecting Trees; and I hereby declare the following to be a full, clear, and exact description of the same.

My invention relates to a method of protecting trees from the ravages of the codlin-moth and other similar enemies of the trees, which become destructive by the ability of the moth-worm to ascend the tree after being hatched out in the earth at its base.

My invention consists of the method which I will hereinafter describe and claim.

Referring to the accompanying drawings for a more complete explanation of my invention, Figure 1 is a perspective view of my tree protector or shield. Fig. 2 shows its application to a tree.

The body or trunk of the tree is represented at A. If the trunk be smooth and approximately cylindrical no preparation will be necessary; but if the trunk be rough, having indentations or a rough bark, the surface at the point where my device is to be applied is made smooth or level by the application of putty or any similar plastic substance by which the surface can be leveled up. I then place around the trunk at this point a ring of soft rope or cord, as at 2, and a protecting device. This device consists of a sheet of flexible material, such as stiff paper or light sheet metal, cut in a segmental form, so as to be curved around the trunk of the tree and secured, thus making the frustum of a cone, as at 3, the narrow diameter of which is nailed or otherwise secured to the tree just above the rope 2. The lower edge of this conical piece is preferably upturned, as shown at 4, to form a sort of channel. The whole surface of this piece is then coated with a viscous sticky substance 5, having the quality of retaining this condition for several weeks and not destroyed or changed by the action of the air or heat. This substance is spread over the outer and inner surface of the cone, and when the worm climbs the trunk of the tree and reaches this cone it is prevented from any further progress by the viscous or glutinous coating upon the cone, in which it becomes entangled and prevented from further progress.

Having thus described my invention, what I claim as new, and desire to secure by Letters Patent, is—

The method herein described of protecting a tree consisting in applying a plastic substance to the trunk to form an even surface; then placing a soft annulus about the trunk proximate to said coated surface; and then placing a flexible strip about the trunk and securing the upper edge just above said annulus, said strip having its surfaces coated with a viscous or glutinous substance.

THOMAS J. HUBBELL.

Witnesses:
HENRY A. HYDE,
JAMES S. KNOX.